United States Patent
Park

(10) Patent No.: US 6,970,800 B2
(45) Date of Patent: Nov. 29, 2005

(54) METHOD FOR PREDICTING ENGINE EXHAUST GAS TEMPERATURE

(75) Inventor: Jin Seo Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 15 days.

(21) Appl. No.: 10/750,666

(22) Filed: Dec. 31, 2003

(65) Prior Publication Data

US 2005/0075823 A1 Apr. 7, 2005

(30) Foreign Application Priority Data

Sep. 18, 2003 (KR) .................. 10-2003-0064827

(51) Int. Cl.$^7$ ................................. G01K 1/00
(52) U.S. Cl. ........................................ 702/130
(58) Field of Search ................ 702/130, 131; 60/274, 286, 285, 284, 295, 303, 273; 701/109; 369/59; 180/65; 123/494; 73/118; 102/112

(56) References Cited

U.S. PATENT DOCUMENTS 5,566,546 A * 10/1996 Rumpsa et al. ............. 60/274
6,742,330 B2 * 6/2004 Genderen .................. 60/286
2003/0187568 A1 * 10/2003 Yasui et al. ................ 701/109

FOREIGN PATENT DOCUMENTS

JP 08-284651 10/1996

* cited by examiner

Primary Examiner—Bryan Bui
Assistant Examiner—Tung S. Lau
(74) Attorney, Agent, or Firm—Morgan Lewis & Bockius LLP

(57) ABSTRACT

In an initial state, the exhaust gas temperature at a catalytic converter inlet is predicted based on a stored exhaust gas temperature of the previous engine shut-off and a time elapse between the previous engine shut-off and subsequent engine restart. In a steady state, the exhaust gas temperature at the catalytic converter inlet is predicted by summing the base exhaust gas temperature at the catalytic converter inlet and the exhaust pipe temperature at the catalytic converter inlet with a predetermined rate.

6 Claims, 4 Drawing Sheets

METHOD FOR PREDICTING ENGINE EXHAUST GAS TEMPERATURE

CROSS-REFERENCE TO RELATED APPLICATIONS

This application claims priority of Korean Application No.10-2003-0064827, filed on Sep. 18, 2002, the disclosure of which is incorporated fully herein by reference.

FIELD OF THE INVENTION

Generally, the present invention relates to a method of predicting engine exhaust gas temperature at a catalytic converter inlet. More particularly, the present invention relates to a method of predicting an engine exhaust gas temperature at a catalytic converter inlet at an initial state, and a method of predicting exhaust gas temperature at a catalytic converter inlet at a steady state.

BACKGROUND OF THE INVENTION

Generally, exhaust gas from an internal combustion engine contains many kinds of noxious elements that cause air pollution, such as HC, CO, and NOx. Accordingly, it is required to eliminate the noxious elements before emitting the exhaust gas to the atmosphere.

A catalytic converter having a substrate is adapted to purify the exhaust gas containing the noxious elements. The substrate includes platinum (Pt) for deoxidizing carbon monoxide and hydrocarbons, and rhodium (Rh) for reducing nitrogenous compounds. The exhaust gas emitted from the engine passes through the catalytic converter and is catalyzed by contact with the catalysts.

The catalytic converter can catalyze the exhaust gas within a limited temperature range. Therefore, it is desirable to have a method of determining exhaust gas temperature at the catalytic converter inlet.

Conventionally, in order to determine the exhaust gas temperature at the catalytic converter inlet, a temperature sensor is provided to the catalytic converter for directly detecting the exhaust gas temperature. Alternatively, a method of predicting the exhaust gas temperature based on a plurality of variables representing the engine state is utilized.

In the case of a conventional method of predicting the exhaust gas temperature, the exhaust gas temperature at the catalytic converter inlet is determined utilizing a predetermined look-up table by applying an air charge rate and engine rpm as inputs. The obtained value is modified based on intake temperature and a time delay from the cylinder outlet to the catalytic converter inlet.

However, determining initial exhaust gas temperature is difficult when the engine is stopped and subsequently restarted. Furthermore, at a steady state, the influence of the exhaust pipe temperature on the exhaust gas temperature at the catalytic converter inlet is not considered. Accordingly, the exhaust gas temperature at the catalytic converter inlet can not be correctly predicted in both the initial state and the steady state.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

This invention includes a method for predicting an exhaust gas temperature at a catalytic converter inlet.

According to an embodiment of this invention, predicting an initial exhaust gas temperature at the catalytic converter inlet is achieved based on an exhaust gas temperature stored when the engine is previously turned off, an intake temperature when the engine is restarted, and an elapsed time between the previous turning the engine off and restarting it.

Furthermore, according to another embodiment of this invention, predicting a steady state exhaust gas temperature at the catalytic converter inlet comprises: determining a basic steady state exhaust gas temperature (ECT_ST_BASE) based on an intake air charge rate and engine rpm; determining a modified steady state exhaust gas temperature (ECT_ST_MOD) by modifying the basic steady state exhaust gas temperature (ET_ST_BASE), considering a plurality of variables representing the engine state; determining a base exhaust gas temperature at the catalytic converter inlet (EGT_CAT_BASE) and an exhaust pipe temperature at the catalytic converter inlet (MNFT_CAT) based on the modified steady state exhaust gas temperature (ECT_ST_MOD), considering a time delay; and determining an exhaust gas temperature at a catalytic converter inlet (EGT_CAT) by summing predetermined weights of the base exhaust gas temperature at the catalytic converter inlet (EGT_CAT_BASE) and the exhaust pipe temperature at the catalytic converter inlet (MNFT_CAT).

A preferred embodiment of the present invention will hereinafter be described in detail with reference to the accompanying drawings.

DETAILED DESCRIPTION OF THE PREFERRED EMBODIMENTS

The method for predicting exhaust gas temperature at a catalytic converter inlet according to this invention is processed by a controller such as an ECU (Engine Control Unit) or an ECM (Engine Control Module). Furthermore, a plurality of look-up tables including predetermined information, which is described hereinafter, are stored in a memory accessed by the controller.

In accordance with the first embodiment of this invention, an initial exhaust gas temperature at the catalytic converter inlet is determined. The initial exhaust gas temperature at the catalytic converter is defined as an exhaust gas temperature at the catalytic converter inlet when the engine is restarted.

Figure 1:
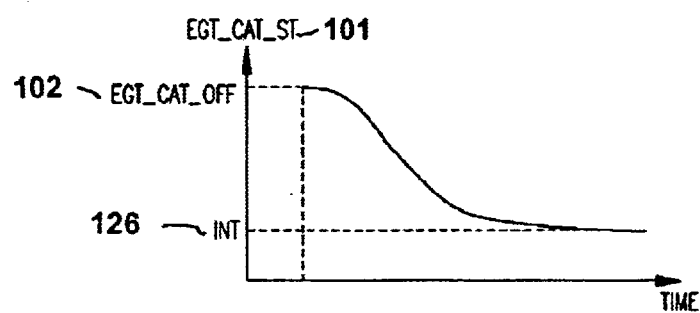
FIG. 1 is a graphical representation of an initial exhaust gas temperature at a catalytic converter versus time elapsed after the engine is previously turned off.

FIG. 1 is a graphical representation 100 of an initial exhaust gas temperature at the catalytic converter versus time elapsed after the engine is previously turned off. When the engine is turned off, the exhaust gas temperature at the catalytic converter inlet is stored in the controller. When the engine is restarted, the intake temperature is detected by a sensor. The initial exhaust gas temperature at the catalytic converter inlet is determined based on the detected intake temperature and the stored exhaust gas temperature at the catalytic converter inlet from when the engine is previously turned off.

After the engine is turned off, the exhaust gas temperature at the catalytic converter inlet naturally decreases with time. Accordingly, as shown in FIG. 1, the initial exhaust gas temperature at the catalytic converter inlet when the engine is restarted (EGT_CAT_ST) 101 is less than the exhaust gas temperature at the catalytic converter inlet when the engine is previously turned off (EGT_ST_OFF) 102, and it converges to the intake temperature when the engine is restarted (INT) 126, after a certain elapsed time.

Figure 2:
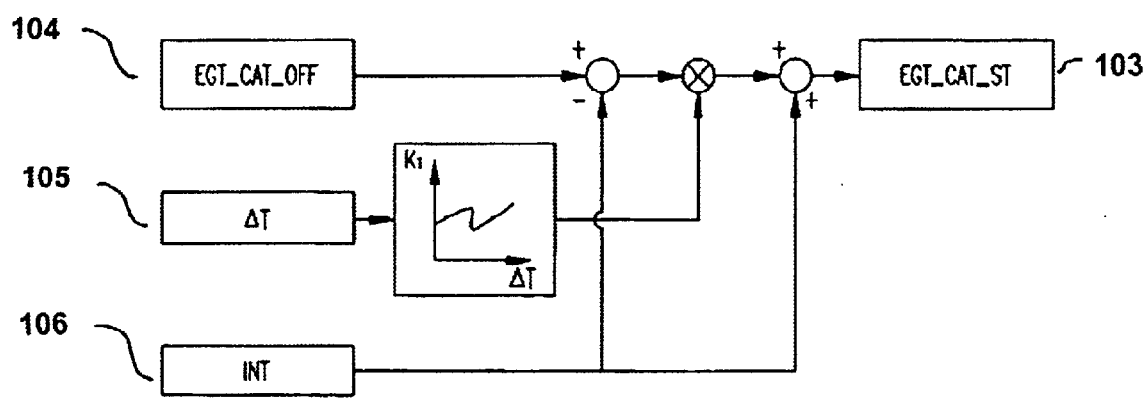
FIG. 2 is a logic flow diagram of the operation of an Engine Control Unit (ECU) or Electronic Control Module (ECM) determining an initial exhaust gas temperature at the catalytic converter inlet when the engine is restarted.

FIG. 2 is a logic flow diagram of the operation of the ECU or ECM determining the exhaust gas temperature at the catalytic converter inlet when the engine is restarted. Determining the initial exhaust gas temperature at the catalytic converter inlet can be represented by the following model.

$$EGT\_CAT\_ST=(EGT\_CAT\_OFF-INT)*K1+INT$$

wherein

EGT_CAT_ST 103 is the initial exhaust gas temperature at the catalytic converter inlet when the engine is restarted;

EGT_CAT_OFF 104 is an exhaust gas temperature at the catalytic converter inlet when the engine is previously turned off;

$K_1$ is a time factor determined according to an elapsed time; and

INT 106 is an intake temperature when the engine is restarted.

In the above model, the time factor $K_1$ can be determined from a predetermined look-up table by applying the elapsed time between the previous engine shut-off and subsequent engine restart.

Figure 3:
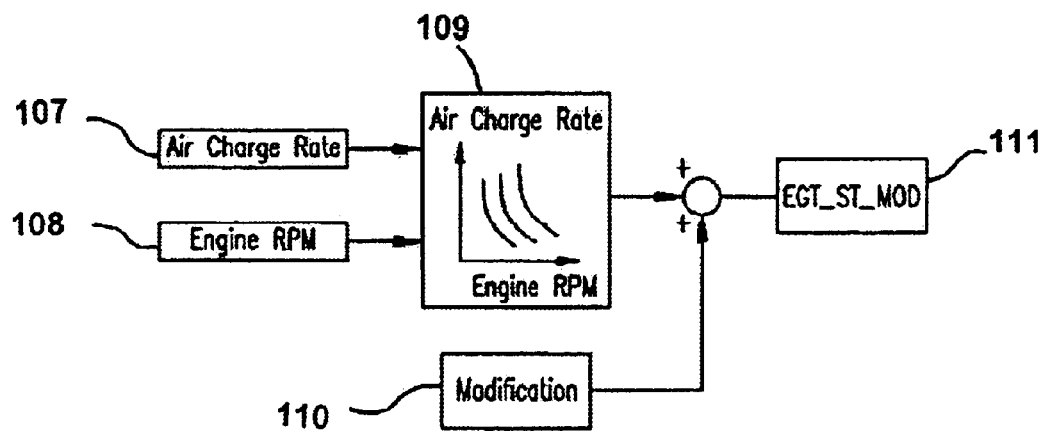
FIG. 3 is a logic flow diagram of the operation of the ECU or ECM in determining a modified steady state exhaust gas temperature.

In accordance with the second embodiment of this invention, the exhaust gas temperature at the catalytic converter inlet is predicted. FIG. 3 is a logic flow diagram of the operation of the ECU or ECM determining a modified steady state exhaust gas temperature.

As shown in FIG. 3, the logic flow processed by the ECM or ECU has inputs indicating an intake air charge rate and engine revolutions per minute (rpm). The intake air charge rate 107 and the engine rpm 108 is applied to a stored look-up table 109 to determine a basic steady state exhaust gas temperature (ECT_ST_BASE).

The basic steady state exhaust gas temperature (ECT_ST_BASE) is modified while considering a plurality of variables representing the engine state, to determine a modified steady state exhaust gas temperature (ECT_ST_MOD) 111. The plurality of variables can be at least one of the catalytic converter temperature, spark advance, air excess rate (λ), and coolant temperature. Accordingly, the modification 110 of the basic steady state exhaust gas temperature (ECT_ST_BASE) is processed with stored look-up tables which represent the effect on the steady state exhaust gas temperature caused by the plurality of variables.

Figure 4:
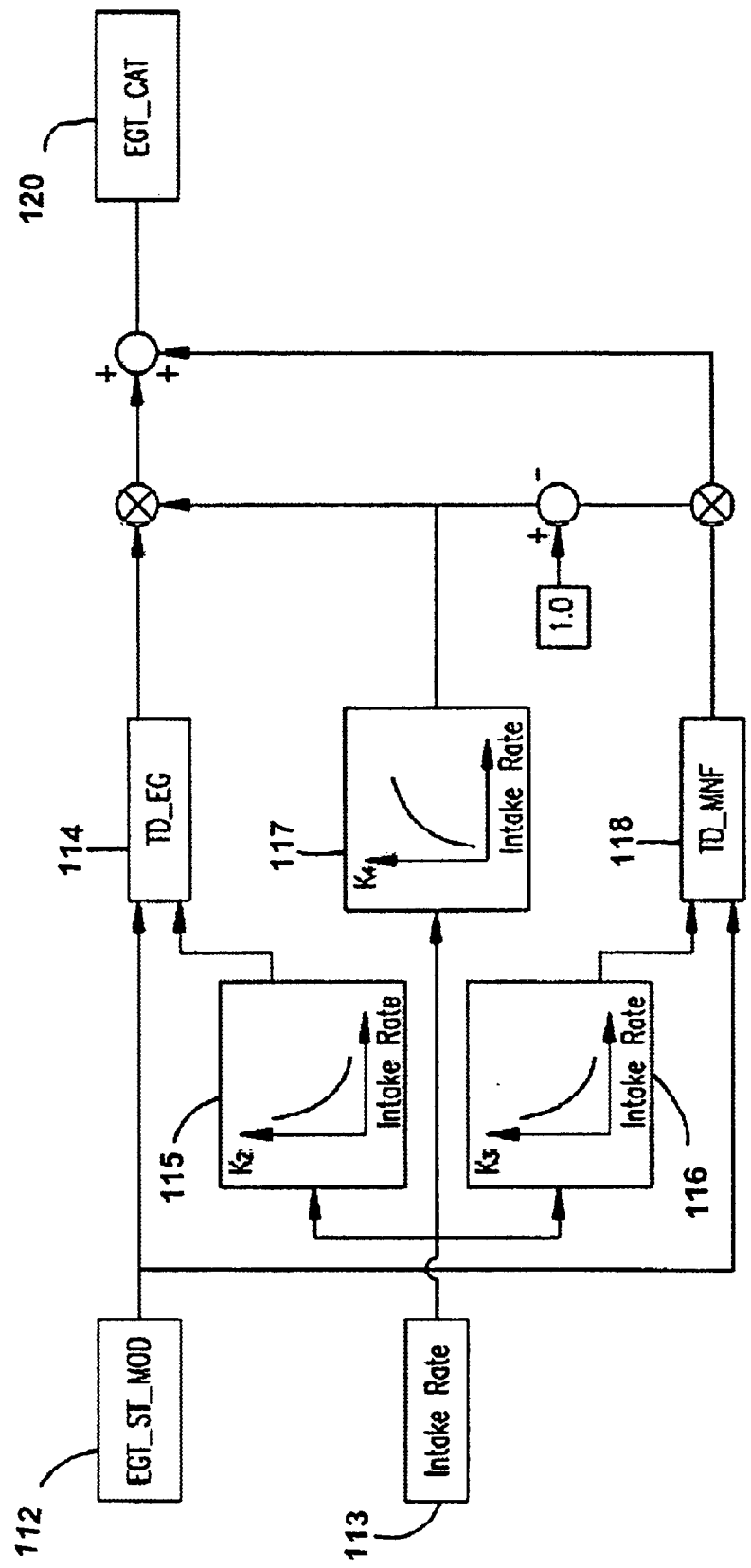
FIG. 4 is a logic flow diagram of the operation of the ECU or ECM in determining the exhaust gas temperature at the catalytic converter inlet.

FIG. 4 is a logic flow diagram of the operation of the ECU or ECM determining the exhaust gas temperature at the catalytic converter inlet. As shown in FIG. 4, the exhaust gas temperature at the catalytic converter inlet (EGT_CAT) 120 is determined based on the modified steady state exhaust gas temperature (ECT_ST_MOD) 112 and intake rate 113. The base exhaust gas temperature at the catalytic converter inlet (EGT_CAT_BASE) is determined based on the modified steady state exhaust gas temperature (ECT_ST_MOD), considering a time delay.

Determining the base exhaust gas temperature at the catalytic converter inlet (EGT_CAT_BASE) can be represented by the following model.

$$EGT\_CAT\_BASE=TD\_EG(K_2)*EGT\_ST\_MOD$$

wherein

EGT_CAT_BASE is a base exhaust gas temperature at the catalytic converter inlet;

TD_EG 114 is a first time delay function with respect to the exhaust gas temperature;

$K_2$ is a time constant of TD_EG; and

EGT_ST_MOD is a modified steady state exhaust gas temperature.

The time constant ($K_2$) of the first time delay function (TD_EG) is set to be inversely proportional to the intake rate (INT_R). That is to say, as the intake rate is increased, heat transfer to the catalytic converter inlet is more rapidly progressed so that the base exhaust gas temperature at the catalytic converter inlet (EGT_CAT_BASE) can more rapidly follow the modified steady state exhaust gas temperature (ECT_ST_MOD).

In the above model, the time constant ($K_2$) can be determined from a predetermined look-up table 115, by applying the intake rate (INT_R) 113. Similarly, the exhaust pipe temperature at the catalytic converter inlet (MNFT_CAT) is determined based on the modified steady state exhaust gas temperature (ECT_ST_MOD), considering a time delay.

Determining the exhaust pipe temperature at the catalytic converter inlet (MNFT_CAT) can be represented by the following model.

$$MNFT\_CAT=TD\_MNF(K_3)*EGT\_ST\_MOD$$

wherein

MNFT_CAT is the exhaust pipe temperature at the catalytic converter inlet;

TD_MNF 118 is a second time delay function with respect to the exhaust pipe temperature;

$K_3$ is a time constant of TD_MNF; and

EGT_ST_MOD is a modified steady state exhaust gas temperature.

The time constant ($K_3$) of the second time delay function (TD_MNF) is set to be inversely proportional to the intake rate (INT_R), and the time constant ($K_3$) can be determined from a predetermined look-up table 116 applying the intake rate (INT_R) 113.

However, heat conductivity of the exhaust pipe is less than for air, such that the exhaust pipe temperature at the catalytic converter inlet (MNFT_CAT) follows the modified steady state exhaust gas temperature (ECT_ST_MOD) less rapidly than the base exhaust gas temperature at the catalytic converter inlet (EGT_CAT_BASE).

Figure 5:
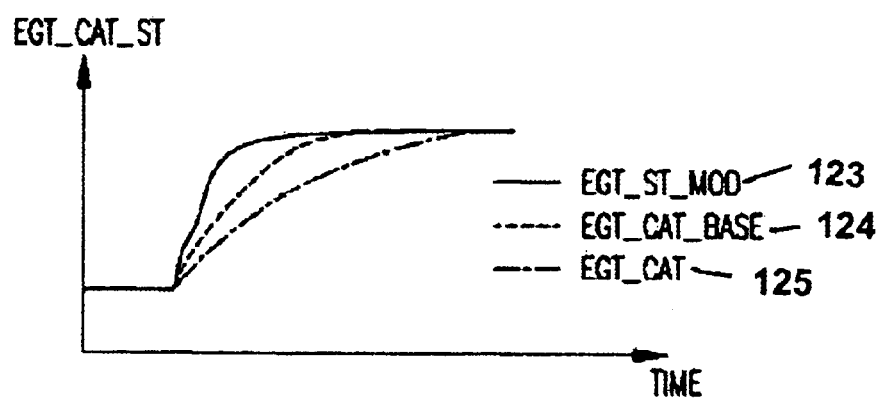
FIG. 5 shows temperature differences between an exhaust gas temperatures at a catalytic converter inlet, a base exhaust gas temperature at the catalytic converter inlet, and a modified steady state exhaust gas temperature according to an embodiment of the present invention.

Accordingly, the time constant ($K_3$) of the second time delay function (TD_MNF) is set to be less than the time constant ($K_2$) of the first time delay function (TD_EG). The above-described relation between exhaust pipe temperature at the catalytic converter inlet (MNFT_CAT) and the base exhaust gas temperature at the catalytic converter inlet (EGT_CAT_BASE) is shown in FIG. 5, compared with the modified steady state exhaust gas temperature (ECT_ST_MOD) 123. Finally, predetermined weights of the base exhaust gas temperature at the catalytic converter inlet (EGT_CAT_BASE) and the exhaust pipe temperature at the catalytic converter inlet (MNFT_CAT) are summed so that the exhaust gas temperature at the catalytic converter inlet (EGT_CAT) can be determined.

Determining the exhaust gas temperature at the catalytic converter inlet (EGT_CAT) can be achieved by the following model.

$$EGT\_CAT = K_4 * EGT\_CAT\_BASE + K_5 * MNFT\_CAT$$

wherein

EGT_CAT 125 is the exhaust gas temperature at the catalytic converter inlet;

EGT_CAT_BASE 124 is the base exhaust gas temperature at the catalytic converter inlet;

MNFT_CAT is the exhaust gas temperature at the catalytic converter inlet;

$K_4$ is a first weight with respect to EGT_CAT_BASE;

$K_5$ is a second weight with respect to MNFT_CAT; and $K_4 + K_5 = 1$.

The base exhaust gas temperature at the catalytic converter inlet (EGT_CAT_BASE) is multiplied by the first weight ($K_4$), and the exhaust gas temperature at the catalytic converter inlet (MNFT_CAT) is multiplied by the second weight ($K_5$).

The first weight ($K_4$) is set to be in proportion to the intake rate (INT_R). Accordingly, as the intake rate is increased, the influence of the base exhaust gas temperature at the catalytic converter inlet (EGT_CAT_BASE) with respect to the exhaust gas temperature at the catalytic converter inlet (EGT_CAT) is increased, and the influence of the exhaust gas temperature at the catalytic converter inlet (MNFT_CAT) with respect to the exhaust gas temperature at the catalytic converter inlet (EGT_CAT) is dependently decreased. In the above model, the first weight ($K_4$) and the second weight ($K_5$) are determined from a predetermined look-up table 117, applying the intake rate (INT_R) 113.

According to the described embodiments of this invention, the initial exhaust gas temperature can be predicted at the time of engine restart, and the exhaust gas temperature at the catalytic converter inlet can be correctly predicted.

The foregoing descriptions of specific embodiments of the present invention are presented for purposes of illustration and description. For example, any methods described herein are merely examples intended to illustrate one way of performing the invention. They are not intended to be exhaustive or to limit the invention to the precise forms disclosed. Obviously many modifications and variations are possible in view of the above teachings. Also, any graphs described herein are not drawn to scale. The embodiments were chosen and described in order to best explain the principles of the invention and its practical applications, to thereby enable others skilled in the art to best utilize the invention and various embodiments with various modifications as are suited to the particular use contemplated. Furthermore, the order of steps in the method are not necessarily intended to occur in the sequence laid out. It is intended that the scope of the invention be defined by the following claims and their equivalents.

What is claimed is:

1. A method of predicting exhaust gas temperature at a catalytic converter inlet of an engine at a time of engine restart, wherein the exhaust gas temperature at the catalytic converter inlet of the engine is predicted based on a stored exhaust gas temperature at the time of engine shut-off and an elapsed time between the engine shut-off and the engine restart, wherein the exhaust gas temperature at the catalytic converter inlet of an engine at the time of engine restart is predicted by the following model:

$$EGT\_CAT\_ST = (EGT\_CAT\_OFF - INT) * K_1 + INT$$

wherein

EGT_CAT_ST is an initial exhaust gas temperature at the catalytic converter inlet when the engine is restarted;

EGT_CAT_OFF is the exhaust gas temperature at the catalytic converter inlet when the engine is previously turned off;

$K_1$ is a time factor determined according to an elapsed time; and

INT is an intake temperature when the engine is restarted.

2. The method of claim 1, wherein the time factor ($K_1$) is determined from a predetermined look-up table, by applying the elapsed time.

3. The method of claim 2, wherein the time factor ($K_1$) starts from 1 and converges to 0 with an increase in the elapsed time.

4. A method of predicting a steady state exhaust gas temperature at a catalytic converter inlet, comprising:

determining a basic steady state exhaust gas temperature based on an intake air charge rate and engine rpm;

determining a modified steady state exhaust gas temperature by modifying the basic steady state exhaust gas temperature, considering a plurality of variables representing an engine state;

determining a base exhaust gas temperature at the catalytic converter inlet and an exhaust pipe temperature at the catalytic converter inlet based on the modified steady state exhaust gas temperature, considering a time delay; and determining an exhaust gas temperature at the catalytic converter inlet by summing predetermined weights of the base exhaust gas temperature at the catalytic converter inlet and the exhaust pipe temperature at the catalytic converter inlet, wherein the plurality of variables includes at least one of catalytic converter temperature, spark advance, air excess rate ($\lambda$), and coolant temperature, wherein the determining a modified steady state exhaust gas temperature by modifying the basic steady state exhaust gas temperature considering a plurality of variables representing the engine state, is achieved based on a plurality of predetermined look-up tables, and wherein determining a base exhaust gas temperature at the catalytic converter inlet and exhaust pipe temperature at the catalytic converter inlet is achieved by the following model:

$$EGT\_CAT\_BASE = TD\_EG(K_2) * EGT\_ST\_MOD$$

$$MNFT\_CAT = TD\_MNF(K_3) * EGT\_ST\_MOD$$

wherein

EGT_CAT_BASE is the base exhaust gas temperature at the catalytic converter inlet;

MNFT_CAT is the exhaust pipe temperature at the catalytic converter inlet;

TD_EG is a first time delay function with respect to the exhaust gas temperature;

TD_MNF is a second time delay function with respect to the exhaust pipe temperature;

$K_2$ is a time constant of TD_EG;

$K_3$ is a time constant of TD_MNF; and

EGT_ST_MOD is the modified steady state exhaust gas temperature.

5. The method of claim 4, wherein a time constant of the second time delay function is less than a time constant of the first time delay function.

6. The method of claim 4, wherein the determining an exhaust gas temperature at the catalytic converter inlet by summing the base exhaust gas temperature at the catalytic converter inlet and the exhaust pipe temperature at the catalytic converter inlet with predetermined rate is achieved by the following model:

$$EGT\_CAT = K_4 * EGT\_CAT\_BASE + K_5 * MNFT\_CAT$$

wherein

EGT_CAT is the exhaust gas temperature at the catalytic converter inlet;

EGT_CAT_BASE is the base exhaust gas temperature at the catalytic converter inlet;

MNFT_CAT is the exhaust pipe temperature at the catalytic converter inlet;

$K_4$ is a first weight with respect to EGT_CAT_BASE;

$K_5$ is a second weight with respect to MNFT_CAT; and $K_4 + K_5 = 1$.

* * * * *